United States Patent [19]

Levy

[11] 3,846,336

[45] Nov. 5, 1974

[54] NOVEL CATALYST FOR CONVERSION OF OLEFINS TO UNSATURATED ALDEHYDES AND ACIDS

[75] Inventor: Leon B. Levy, Nueces, Tex.

[73] Assignee: Celanese Corporation, New York, N.Y.

[22] Filed: Aug. 10, 1972

[21] Appl. No.: 279,585

Related U.S. Application Data

[62] Division of Ser. No. 124,939, March 16, 1971, Pat. No. 3,703,551.

[52] U.S. Cl.............. 252/435, 252/437, 260/533 N, 260/604 R
[51] Int. Cl.............................................. B01j 11/82
[58] Field of Search..... 260/533 N, 604 R; 252/435, 252/437

[56] References Cited
   UNITED STATES PATENTS

| | | | |
|---|---|---|---|
| 3,192,259 | 6/1965 | Fetterly et al. | 252/437 X |
| 3,326,961 | 6/1967 | Eden et al. | 252/437 X |
| 3,423,331 | 1/1969 | Eden | 252/437 |

*Primary Examiner*—Patrick P. Garvin

[57] ABSTRACT

This disclosure relates to the oxidation of olefins to unsaturated aldehydes and unsaturated acids such as the conversion of propylene to acrolein and acrylic acid in the vapor phase and at an elevated temperature in the presence of a catalyst comprising phosphorus, molybdenum and tellurium dioxide supported with rhenium on an inert support and methods for preparation of the catalyst.

4 Claims, No Drawings

NOVEL CATALYST FOR CONVERSION OF OLEFINS TO UNSATURATED ALDEHYDES AND ACIDS

This is a division, of application Ser. No. 124,939, filed Mar. 16, 1971 now U.S. Pat. No. 3,703,551.

BACKGROUND OF THE INVENTION

1. Field of the Invention

This invention relates to methods for the oxidation of monoolefins to the corresponding unsaturated aldehydes and unsaturated acids with a novel catalyst as well as methods for the preparation of these catalysts.

2. Description of the Prior Art

Processes for the production of unsaturated aldehydes and unsaturated acids by the oxidation of olefins with air or molecular oxygen over various catalysts are known in the art. For example one such process wherein the catalyst contains the oxides of bismuth, molybdenum and phosphorus has been previously described in U.S. Pat. No. 2,941,007. The same process carried out over a catalyst comprised of the oxides of iron, bismuth, phosphorus and molybdenum has been disclosed in German Patent No. 1,125,901. According to the process of U.S. Pat. No. 2,941,007, the process is conducted by contacting in the vapor phase a gaseous mixture comprising the monoolefin and an oxygen-containing gas with a solid catalyst. In general, the processes disclosed in this patent are conducted at pressures near atmospheric, i.e., about 10 to 100 psig. and temperatures in the range of 500° to 1,000°F.

U.S. Pat. No. 3,392,196 describes such a process wherein a catalyst of the empirical formula $Mo_{10}Mn_2P_{2-20}O_{39-120}$ is utilized for the oxidation of propylene or isobutylene to form acrolein, methacrolein and acrylic acid or methacrylic acid. In U.S. Pat. No. 3,240,806 there is disclosed a process for the production of unsaturated aliphatic acids and aldehydes such as acrylic acid and acrolein from propylene wherein the reaction is conducted in the presence of a catalyst comprising cobalt molybdate in association with a compound of tellurium. Also, U.S. Pat. No. 2,881,212 discloses catalysts for this reaction which comprise phosphomolybdic acid or a salt thereof. However, these patents fail to suggest combinations of phosphorus, molybdenum and tellurium dioxide for use in processes of this type. Many other catalysts are also known for such oxidations. However, research is constantly underway for new and improved processes and catalysts since most catalysts presently known suffer such disadvantages as short catalyst life, low conversions and/or low selectivities to desired products.

In copending application Ser. No. 795,028, filed Jan. 29, 1969, of Leon B. Levy, entitled "Oxidation of Olefins to Unsaturated Aldehydes and Acids," and assigned to the same assignee, there are disclosed novel catalysts comprising tungstenmolybdenum-tellurium oxide which have been found to be excellent catalysts for the conversion of propylene to acrolein and acrylic acid by oxidation procedures. These catalysts are of the empirical formula $Mo_xW_yTe_zO_n$, wherein x, y, z and n are numbers such that the atomic ratios of Mo:W:Te:O are about 100:50-250:0.3-3.5:400-1100 respectively.

However, there remains a need for alternative catalysts for this reaction and work has continued in that area. The present invention therefore provides improved catalysts and their use in the oxidation of monoolefins to unsaturated aldehydes and unsaturated acids and especially the conversion of propylene to acrolein and acrylic acids in the presence of such catalysts.

Unsaturated aldehydes such as acrolein and methacrolein are of course known to be useful for oxidative conversion to unsaturated acids such as acrylic acids and methacrylic acids. Processes of this type are disclosed for example in U.S. Pat. Nos. 2,881,212, 2,881,213 and 2,881,214. The resulting acrylic acids are well known and in wide use for esterification and polymerization to the acrylate polymers.

SUMMARY OF THE INVENTION

It is accordingly one object of the present invention to provide catalysts which provide excellent results in the oxidation of monoolefins to unsaturated aldehydes and acids which overcome or otherwise mitigate the problems of the prior art.

A further object of the invention is to provide oxidation catalysts for the oxidation of monoolefins to unsaturated aldehydes which catalysts comprise phosphorus, molybdenum, tellurium, rhenium and oxygen on an inert support.

A still further object of the invention is to provide methods for the preparation of the novel catalysts.

Other objects and advantages of the present invention will become apparent as the description thereof proceeds.

In satisfaction of the foregoing objects and advantages there are provided by the present invention phosphorus, molybdenum tellurium, rhenium and oxygen-containing catalysts useful in the oxidation of monoolefins to unsaturated aldehydes and acids such as propylene to acrolein and acrylic acid.

DESCRIPTION OF PREFERRED EMBODIMENTS

The novel catalysts of the present invention are particularly useful in the conversion of olefins to their oxidation products and especially for the conversion of mono-olefins to unsaturated aldehyde compounds and unsaturated carboxylic acids. In preferred embodiments the catalyst is particularly useful for the oxidation of monoolefins containing about 3 to 5 carbon atoms and mixtures thereof to the corresponding unsaturated aldehydes and unsaturated acids. For example, propylene is converted to acrolein and acrylic acid and isobutylene is converted to methacrolein and methacrylic acid in the most preferred embodiments.

It has been found that the catalysts of this invention provide surprisingly good conversions and yields of the desired products under oxidation conditions.

An important advantage of the process in this regard is that the aldehydes recovered from the process of the invention are of such composition that the mixture resulting from the oxidation process may be subjected directly for further conversion of the aldehydes present to the corresponding unsaturated acids. The latter reaction is generally carried out by a gas phase reaction in the presence of a catalyst as disclosed for example in the above-mentioned U.S. patents.

As pointed out above, the primary feature of the present invention resides in the catalyst utilized to convert the moloolefins to the unsaturated aldehydes and acids. Thus, the catalyst of the present invention in essence comprises phosphorus molybdenum, and tellurium dioxide supported with rhenium metal on an inert support, the support preferably being inert alumina. A convenient catalyst is prepared by the reaction of phosphomolybdic acid as the source of both the phosphorus and molybdenum, and a source of tellurium, telluric acid, or highly preferably tellurium dioxide, with the mixture being supported with rhenium metal on an inert support such as alumina.

The phosphorus and molybdenum components of the catalyst may be obtained from any source but it is preferred that derivatives of these components be such as to provide phosphomolybdic acid on reaction thereof. Thus, the phosphorus component may be phosphoric acid or a derivative thereof such as a salt and the molybdenum component may be molybdic acid or a derivative thereof such as a salt. Ideally, however, the catalyst is formed directly from phosphomolybdic acid which is readily available. The phosphomolybdic acid or mixture thereof in which it is formed is incorporated into the catalyst as a solution thereof in water or other solvent. Thus, in a preferred procedure for preparation of the catalyst of this invention, an inert support is initially prepared having admixed therewith as by impregnation about 0.1 up to about 3.0 weight percent, preferably about 0.5 weight percent, or rhenium metal. The preferred support is alumina but it may also contain varying amounts of silica. Other inert supports may also be used, however, such as titania, zirconium oxide and the like. This mixture of rhenium on the inert support is then broken up so as to obtain particles of rhenium on inert support of a size of about −20 to +30 mesh and the resulting particles are dried at a temperature of about 115° to 150°C. preferably 130°C. for about 1 to 10 hours.

To the resulting dry solids or particles is then added a solution of the required amount of tellurium dioxide contained in a small amount of a concentrated mineral acid such as hydrochloric acid. The tellurium dioxide is a critical component of the catalyst. The resulting solution is substantially completely absorbed by the solid particles. The resulting mixture is then dried at a temperature of about 115° to 150°C. for 1 to about 10 hours whereupon there is added the aqueous solution of the required amount of phosphomolybdic acid. The resulting solid is then dried at a temperature of about 115° to 150°C. and thereafter calcined at a temperature of about 250° to 600°C. in the presence of an oxygen-containing gas such as air for a period of about 2 to 50 hours. The catalyst is now prepared for use in the process of the invention.

The catalyst mixture prepared by the above described procedure contains about 0.1 to 3.0 percent by weight of rhenium in the mixture. It will also preferably contain about 1 to 10 percent by weight of tellurium dioxide per 100 parts of the phosphomolybdic acid used. The amount of concentrated mineral acid in which the tellurium dioxide is dispersed for use in preparative process is generally just that amount which can be absorbed by the support. The same holds true for the solution of the phosphomolybdic acid in water prior to the addition of this material.

The oxidation process of the present invention utilizing the novel catalysts may be carried out continuously or noncontinuously and the catalyst may be present in various forms such as in fixed beds or as a fluidized system. Portions of the reactants which do not undergo reaction may be recycled if desired. Also where it is desired to produce an unsaturated acid as the ultimate product it may be desirable to recycle at least a portion of the unsaturated aldehyde formed during the reaction.

The temperatures utilized should generally range between about 250° to 550°C. although the exact temperature utilized in a particular situation will depend largely on the desired product composition. Thus if it is desired to produce an oxygenated product consisting largely of unsaturated aldehydes with no or at least small amounts of unsaturated acids present, then temperatures in the range of 300° to 400°C. are preferred. However if it is desired to produce a product which contains minor portions of unsaturated acid in addition to the major portions of unsaturated aldehyde, then higher temperatures in the range of 375° to 550°C. are preferably utilized. The production of mixtures of unsaturated aldehydes and acids are generally most advantageous when the product is to be further oxidized in a second step so as to produce unsaturated acids as the ultimate end product. For example a two step process may be utilized for converting propylene to acrylic acid.

The pressure utilized in the process of the present invention may be subatmospheric, atmospheric or superatmospheric but should be between about 0.5 to 3.0 atmospheres for best results, although pressures ranging up to 10.0 atmospheres may be suitably employed. The contact time for the reactants with the catalyst under the reaction conditions should generally range between about 0.1 to 25 seconds but is preferably a time within the range of 0.5 to 10 seconds. It has been found that in addition to being dependent on the temperature as discussed above, the amount of unsaturated acids produced at a given temperature and pressure will increase as the contact time increases. Thus where it is desired to produce no or relatively small amounts of unsaturated acids the contact time will generally be between 0.1 to 10 seconds and will usually be between 4 to 15 seconds when it is desired to produce a product containing minor portions of unsaturated acid in addition to the unsaturated aldehyde. As used herein the term contact time refers to the contact time adjusted to 25°C. and atmospheric pressure (conditions denoted by NTP). Thus the contact time is calculated by dividing the volume of the catalyst bed (including voids) by the volume per unit time flow rate of the reactants at NTP.

The oxygen source necessary as a reactant in the process may be from concentrated molecular oxygen or may be from a more dilute oxygen-containing gas wherein the molecular oxygen is mixed in varying amounts with an inert diluent gas such as nitrogen, argon, or carbon oxides. For instance air may be utilized as the source of oxygen. The ethylenically unsaturated hydrocarbon and/or oxygen-containing gas may be separately introduced into the reaction zone at one or a plurality of points along the length of the reaction zone or may be premixed before entering the reaction zone. However the contact of the olefin and the oxygen-containing charge are preferably kept to a minimum before entering the reaction zone such as for the removal of undesirable components therefrom.

In conducting the oxidation reaction, the gaseous feed mixture should generally contain about 0.5 to 7.0 moles of oxygen per mole of the ethylenically unsaturated hydrocarbon although the preferable range is from 1.0 to 5.5 moles per mole. Although it is not required, water, preferably in the form of steam, is also desirably present in the gaseous feed in amounts of from 1.5 to 15, preferably 5.0 to 12, moles per mole of unsaturated hydrocarbon. Care should be taken to avoid contacting the catalyst with liquid water during operation. In addition to water, diluents which are gaseous under the reaction conditions and are relatively inert may be introduced into the system. Suitable diluents include $CO_2$, nitrogen and flue gas as well as paraffinic hydrocarbons such as are frequently present in commercially-available propylene and isobutylene, for example mixtures of propane and propylene obtained from cracking units.

The ethylenically unsaturated hydrocarbons that may be oxidized in accordance with the present invention are preferably alkenes of 3 to 5 carbon atoms. By "alkene" is meant an acrylic hydrocarbon having a single ethylenic double bond as the only unsaturation. The present process is best suited for the conversion of propylene and isobutylene.

The following examples are presented to illustrate the invention, but it is not to be considered as limited thereto.

EXAMPLE I

This example illustrates preparation of a catalyst for use in the process of this invention. In this example, a batch of .5 percent rhenium or inert alumina (obtained from Engelhard) was broken up to −20 to +30 mesh and dried at 130°C. for 3 hours. Then to 8.0 grams (10 cc) of the resulting dried solid was added a solution of 0.04 grams of tellurium dioxide in 5 cc of concentrated hydrochloric acid. The resulting solution was completely absorbed by the solid. This material was then dried at 130°C. for 2 hours and to it was then added a solution of 4.0 grams of phosphomolybdic acid in 7 cc of water. The solid was again dried at 130°C. and calcined at 400°C. for 16 hours.

The catalyst resulting from this example was then used in Example II in the conversion of propylene to acrolein and acrylic acids. The catalyst has the following empirical formula: $Mo_{100}P_{9.9}Te_{1.2}Re_{1.1}O_n$ where n depends on the valence requirements of the metals.

EXAMPLE II

In this example, propylene was oxidized essentially to acrolein and acrylic acid utilizing the catalyst prepared in Example I. In this example, a vapor phase reaction was carried out with air as the oxygen source and water in the form of steam being employed in both runs. The resulting runs are set forth below in Table I wherein the various conditions for the reaction and the products thereof are set forth in detail. The catalyst employed was the same for each run.

TABLE I

|  | Run 1 | Run 2 |
|---|---|---|
| Bath Temperature, °C. | 397 | 445 |
| Mole ratio propylene: oxygen:water | 1:3.6:7.9 | 1:3.4:7.3 |
| Contact time, sec. | 2 | 2 |
| Propylene conversion, wt.% | 27 | 53 |
| Acrolein yield, mol % | 15 | 26 |
| Acrolein efficiency, mol % | 55 | 49 |
| Acrylic acid yield, mol % | 1 | 9 |
| Acrylic acid efficiency, mol % | 5 | 17 |
| Oxygen conversion, wt. % | 15 | 30 |
| Carbon accountability, wt. % | 98 | 106 |

The invention has been described herein with reference to certain preferred embodiments. However, as obvious variations thereon will become apparent to those skilled in the art, such obvious variations are considered to be within the scope of the invention.

What is claimed is:

1. A catalyst composition consisting essentially of rhenium on an inert support, impregnated with tellurium dioxide and phosphomolybdic acid, containing about 0.1 to 3.0 percent by weight of rhenium and tellurium dioxide/phosphomolybdic acid in a ratio of 1:100 to 10:100 parts by weight.

2. The catalyst of claim 1, wherein the rhenium on an inert support is in the form of particles having a particle size of about −20 to +30 mesh.

3. The catalyst composition of claim 2 having the empirical formula $Mo_{100}P_{9.9}Te_{1.2}Re_{1.1}O_n$ where n is a numerical value satisfying the valence requirements of the respective metals.

4. A composition according to claim 1 wherein said support is alumina.

* * * * *